(12) United States Patent
Henry

(10) Patent No.: US 6,202,565 B1
(45) Date of Patent: Mar. 20, 2001

(54) MODULAR CABLE BRIDGING PROTECTIVE DEVICE

(76) Inventor: Stephen K. Henry, 3825 Northbrook Dr., #F, Boulder, CO (US) 80302

( * ) Notice: Subject to any disclaimer, the term of this patent is extended or adjusted under 35 U.S.C. 154(b) by 0 days.

(21) Appl. No.: 09/228,711

(22) Filed: Jan. 12, 1999

(51) Int. Cl.⁷ .................................................. B61K 13/00
(52) U.S. Cl. .......................................................... 104/275
(58) Field of Search ........................... 104/275; 174/68.1, 174/97, 101; D13/155; 403/174, 403, 212, 231, 412, 340, 52, 150, 353, 402; 52/211, 213, 217

(56) References Cited

U.S. PATENT DOCUMENTS

| D. 412,490 | * | 8/1999 | Henry | D13/155 |
| D. 415,112 | * | 10/1999 | Henry | D13/155 |
| D. 415,471 | * | 10/1999 | Henry | D13/155 |
| D. 418,818 | * | 1/2000 | Henry | D13/155 |
| 1,914,830 | | 6/1933 | Kostohris . | |
| 1,956,125 | * | 4/1934 | Leister | 104/275 |
| 3,837,136 | * | 9/1974 | Graham et al. | 52/760 |
| 3,965,967 | | 6/1976 | Jentzsch et al. . | |
| 4,067,258 | | 1/1978 | Valeri . | |
| 4,101,100 | | 7/1978 | Smith et al. . | |
| 4,493,583 | * | 1/1985 | Wallace | 403/402 |
| 4,677,799 | | 7/1987 | Zarembo . | |
| 4,712,942 | * | 12/1987 | Brown | 403/174 |
| 5,095,822 | | 3/1992 | Martin . | |
| 5,267,367 | | 12/1993 | Wegmann, Jr. . | |
| 5,566,622 | | 10/1996 | Ziaylek, Jr. et al. . | |
| 5,673,517 | * | 10/1997 | Stanclift | 403/353 |
| 5,777,266 | * | 7/1998 | Herman et al. | 174/68.1 |
| 5,855,076 | * | 1/1999 | Warner, Jr. et al. | 33/562 |

* cited by examiner

Primary Examiner—S. Joseph Morano
Assistant Examiner—Lars A. Olson
(74) Attorney, Agent, or Firm—Dorr, Carson, Sloan & Birney, P.C.

(57) ABSTRACT

A modular cable bridging device for protecting cables. A plurality of ramps and central members are provided, each having a respective sidewall. The central members are formed with a passageway therethrough for receiving a cable. A ramp connector extends along at least a portion of the midsection of the sidewall of each ramp. A complementary central member connector on the midsection of the opposing sidewalls of each central member slidably engage the ramp connectors. The ramp is thus secured to the central member and bridges the cable when the ramp sidewalls are positioned parallel and adjacent to the central member sidewalls and the ramp connector and central member connector are slid together in a direction parallel to the sidewalls. In addition, the central members can be secured to one another with an interconnect member formed by two opposing ramp connectors that slidably engage the complementary central member connector in the manner described above. Each ramp is also provided with end connectors. Additional ramps and central members can thus be added end-to-end with the connecting and receiving members engaging one another in a laterally stable manner.

22 Claims, 8 Drawing Sheets

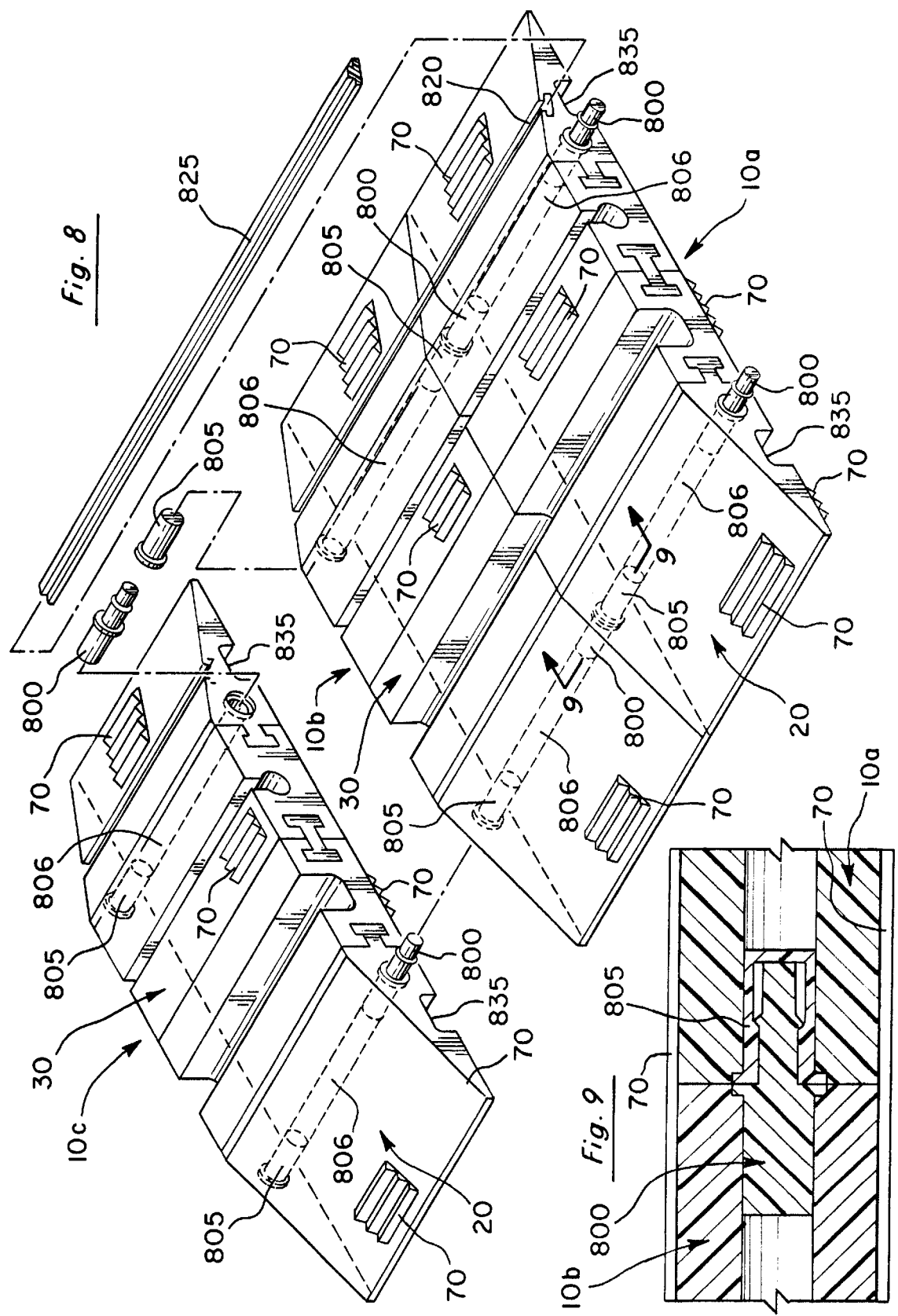

MODULAR CABLE BRIDGING PROTECTIVE DEVICE

BACKGROUND OF THE INVENTION

1. Field of the Invention.

The present invention relates generally to the field of hose and cable bridges. More specifically, the present invention discloses a modular cable bridging protective device.

2. Statement of the Problem.

Hose and cable bridging protective devices have been used in the past, including the following:

| Inventor | Patent No. | Issue Date |
|---|---|---|
| Kostohris | 1,914,830 | June 20, 1933 |
| Jentzsch et al. | 3,965,967 | June 29, 1976 |
| Valeri | 4,067,258 | Jan. 10, 1978 |
| Smith et al. | 4,101,100 | July 18, 1978 |
| Zarembo | 4,677,799 | July 7, 1987 |
| Martin | 5,095,822 | Mar. 17, 1992 |
| Wegmann, Jr. | 5,267,367 | Dec. 7, 1993 |
| Ziaylek, Jr. et al. | 5,566,622 | Oct. 22, 1996 |

Kostohris discloses a flexible device that protects fire hoses by providing opposing ramps forming a passage over the hose. Kostohris teaches that additional units may be placed end to end and secured together using loose fit dovetail lugs and recesses molded into the rubber of the device Jentzsch et al. teach a portable crossover for high tonnage earth moving vehicles having a U-shaped channel and a strip for covering the channel, and further includes a rigid plate or cable for connecting a tow vehicle to relocate the crossover.

Valeri teaches a crossover unit with a wedge-shaped rubber insert or plug that resists deflection and closes the hose receiving slot.

Smith et al. teach an aircraft flight line servicing system whereby the distribution lines run under a multi-sectional unit of extruded aluminum sections that lock together.

Zarembo discloses a multi-sectional raceway for use in combination with a pair of interconnected detection system panels. The sections are flexibly interconnected by pressure engageable members and at least one E-shaped girder structure underneath the entire width of the platform section providing at least one passageway for electrical wiring.

Martin teaches a cable crossover device for protecting electrical cables having a hinged lid secured by Velcro that covers the conduit and assumes part of the load. Modular sections can be coupled together by a strengthened interlocking system allowing for a variable length device.

Wegmann, Jr. discloses an interlocking, elongate ramp with a covered conduit channel. Adjacent ramp units are interlocked with members that project outwardly and upwardly from the end of each ramp unit to form a chain of ramp units.

Ziaylek, Jr. et al. disclose a collapsible hose bridge having a central support member that covers the hose, and two detachable ramps. Each ramp is attached by means of a curved lip that engages an arcuate slot running the length of the central support member. Ziaylek, Jr. et al., also show an alternative embodiment that permits several central support members to be connected side by side.

A need exists to provide a modular protective device for bridging cables or hoses that is both strong and reduces stress on the interlocking members. Another need exists to provide a means for interlocking multiple central members. A further need exists to provide a simple means for connecting multiple modular cable bridging members in a laterally stable manner.

3. Solution to the Problem.

None of the prior art references discussed above show a modular cable-bridging protective device with a central member slidably engaging ramps with a thru-section connector that receives a complementary connector having an elongated portion ending in an enlarged head. The connectors formed by the enlarged head of the present invention are shaped so as to be slidably engaged by the thru-section connector and extend substantially along the mid-line of the side wall of the ramp and central member. By including these features, the present invention provides strength, stability, and modularity to the ramp and central members while reducing stress on the connectors. The present invention further includes end connectors on each ramp for engaging additional assembled cable-bridging devices so that the length of the modular cable bridging device can be extended to bridge and protect any length cable. The device assembled in this manner will not slide laterally out of position, which could potentially damage the cable. In addition, the present invention includes an interconnect member for attaching a plurality of central members in a side-by-side arrangement. This allows the central section to be elongated and may provide additional passageways through the assembled device to protect multiple cables while maintaining the modularity of the cable bridging device.

SUMMARY OF THE INVENTION

The present invention is a modular cable bridging device for protecting cables, hoses, and the like. The present invention is made up of modular ramps and central members. The central members are formed with a passageway for receiving and protecting a cable. A ramp connector extends along at least a portion of the sidewall of each ramp. The ramp connector can be either formed by an elongated section leading into an enlarged head portion, or can be a thru-section. Likewise, a complementary central member connector on the opposing sidewalls of each central member can be either formed by an elongated section leading into an enlarged head portion, or can be a thru-section. Whether the ramp connector or the central member connectors are thru-sections or the enlarged head connectors is not important. It is only important that the respective connectors complement one another (e.g., the ramp connector compliments the central member connector). The ramp sidewalls are positioned parallel and adjacent to the central member sidewalls and then the ramp connector and central member connector are slid together in a direction parallel to the sidewalls to secure the ramp to the central member and provide a bridge over the cable. In addition, an interconnect member may be used to connect two central members in a side-by-side relationship. The interconnect member is formed by two opposing ramp connectors, which can be of either configuration described above, preferably the same configuration as the ramp connectors. The interconnect member slidably engages the complementary central member connector, in the manner described above, to secure two central members to one another. Each ramp also has end connectors that allow each ramp to engage an additional ramp in an end-to-end relationship. Thus, the modular cable bridging device of the present invention can be extended in a laterally stable manner by adding additional ramps and central members side-by-side and connecting the devices end-to-end with the end connectors.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 8 is a perspective view of an another embodiment showing various alternative features that can be implemented, individually or in combination with one another, with the present invention.

FIG. 9 is a detail cross-sectional view of the ribbed plug member 800 and receiving member 805 shown in FIG. 8.

DETAILED DESCRIPTION OF THE INVENTION

Figure 1:
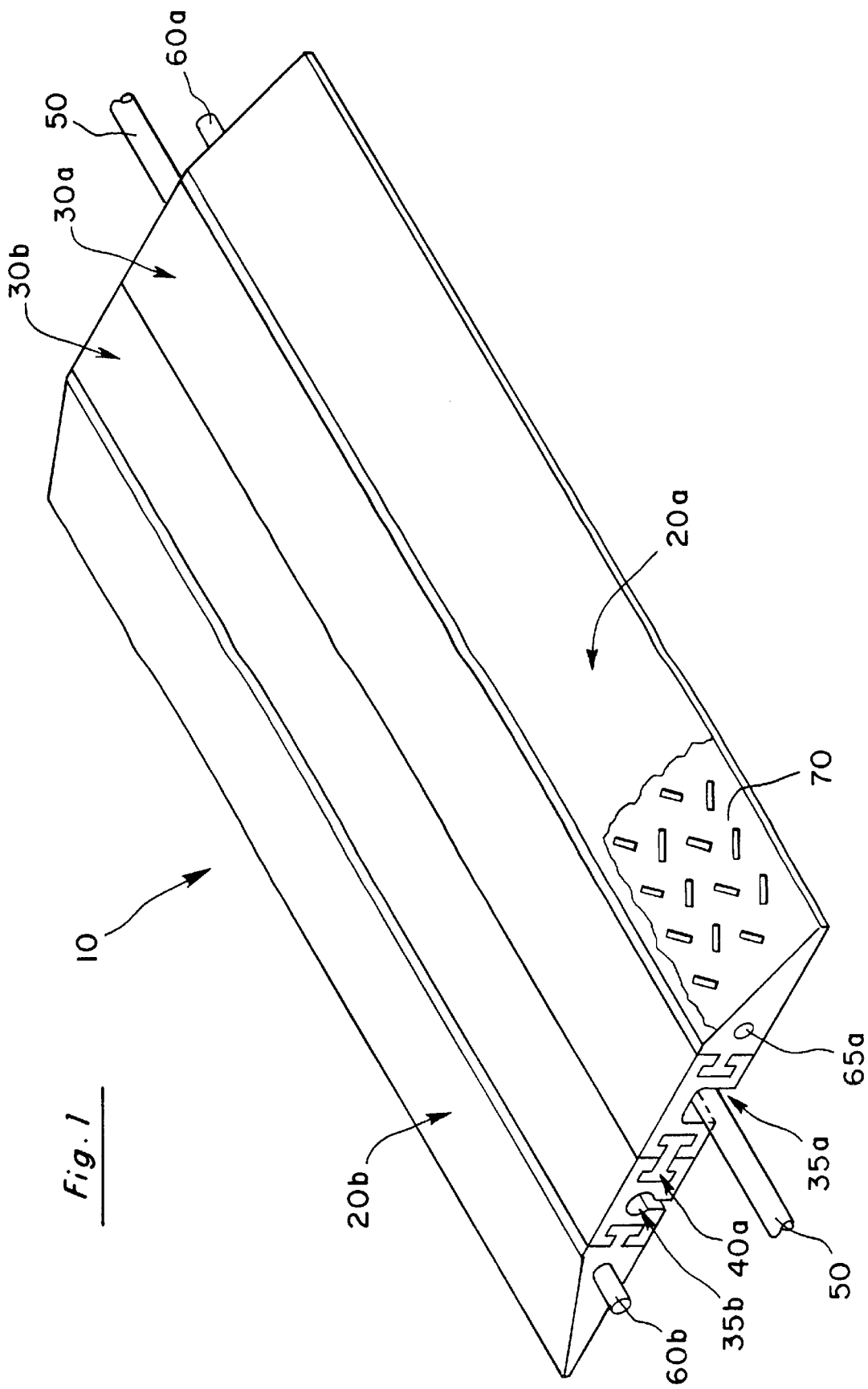
FIG. 1 is a perspective view of one embodiment of the present invention.

Overview. A modular cable bridging device 10 is shown in FIG. 1, formed by ramps 20a and 20b, central members 30a and 30b, and an interconnect member 40a. Ramp 20a is connected to a central member 30a. The central member 30a is then connected to a second central member 30b using an interconnect member 40a. Central members 30a and 30b have passageways 35a and 35b, respectively, for receiving a cable 50. The modular cable bridging device 10 is shown completed with the second ramp 20b connected to the central member 30b. End connectors (e.g., plug members 60a, 60b, and complementary receiving member 65a) at the ends of the ramps 20a and 20b allow devices 10 to be connected end-to-end.

It is to be expressly understood that the term "cable" is used to mean, for example, a group of wires, coaxial cables, electrical extension cords, gas lines, hoses, etc. Any type or size cable 50 can be used with the present invention. For example, the present invention can be used with cables the size of a conventional household electrical extension cord, a garden hose, a pneumatic hose, or even a fire hose. Multiple cables 50 can also be protected within a single passageway 35. The size of passageway 35, and therefore the ramps 20 and the central members 30, will control the size of cable 50 that can be protected by the modular cable bridging device 10.

A prominent feature of the present invention is that any number of central members 30 can be used to provide additional, separate cable passageways 35 (e.g., passageways 35a and 35b shown in FIG. 1). Optionally, a single central member 30 can be used if only a single passageway 35 is desired. In the preferred embodiment, when additional central members 30 are used, at least one interconnect member 40 is required to connect two central members 30 to one another, as will be discussed below. Attaching a second ramp 20 is also optional. For instance, if the device 10 is being used to step up to a second level (i.e., near a step of a stairway), perhaps only one ramp 20 may be needed.

In another embodiment, one central member 30 may be permanently connected to the ramp 20 or each central member 30 may have multiple passageways 35. However, in the preferred embodiment, each member is separate and symmetrical, thus making the device 10 modular.

The shape of the passageway 35 is immaterial to the present invention. Two embodiments are shown in FIG. 1, however, any suitable shaped passageway 35 can be used under the teachings of the present invention. The passageway 35a is shown as substantially U-shaped, while passageway 35b has a substantially circular cross-section. It is only important that the passageway 35 provide a channel along the length of the central member 30 to receive the cable 50. In addition, the modularity of the device 10 allows the central members 30, having similar or different shaped passageways 35, to be linked to one another. For example, central member 30a having U-shaped passageway 35a can be linked to a central member 30b having a circular passageway 35b, as shown in FIG. 1, or to another central member having a U-shaped passageway similar to 35a. In addition, the modularity of the central member 30 permits the passageway 35 to be installed so that the passageway 35 is facing up (e.g., an inverted U, as shown in FIG. 8).

The device 10 can be made of any material that provides the requisite strength to allow cars, trucks, carts, pedestrians, etc. to pass over the cable 50. In the preferred embodiment, the device 10 is made of hard molded plastic, such as polyurethane, PVC, rubber, etc. In addition, ramps 20 can be either solid, or the ramps 20 may be hollow and have internal supporting members. The dimensions of device 10, including the slope of ramps 20, are not important to the present invention and will be controlled by the size of the passageways 35.

A pattern 70 of any suitable design may also be placed on the surface (top or bottom) of the ramps 20 or central members 30 to prevent slipping. For example, a series of parallel ridges, as shown in FIG. 8, can be readily formed on the ramps 20 or central members 30 if these components are made by extrusion.

Figures 2A, 2B:
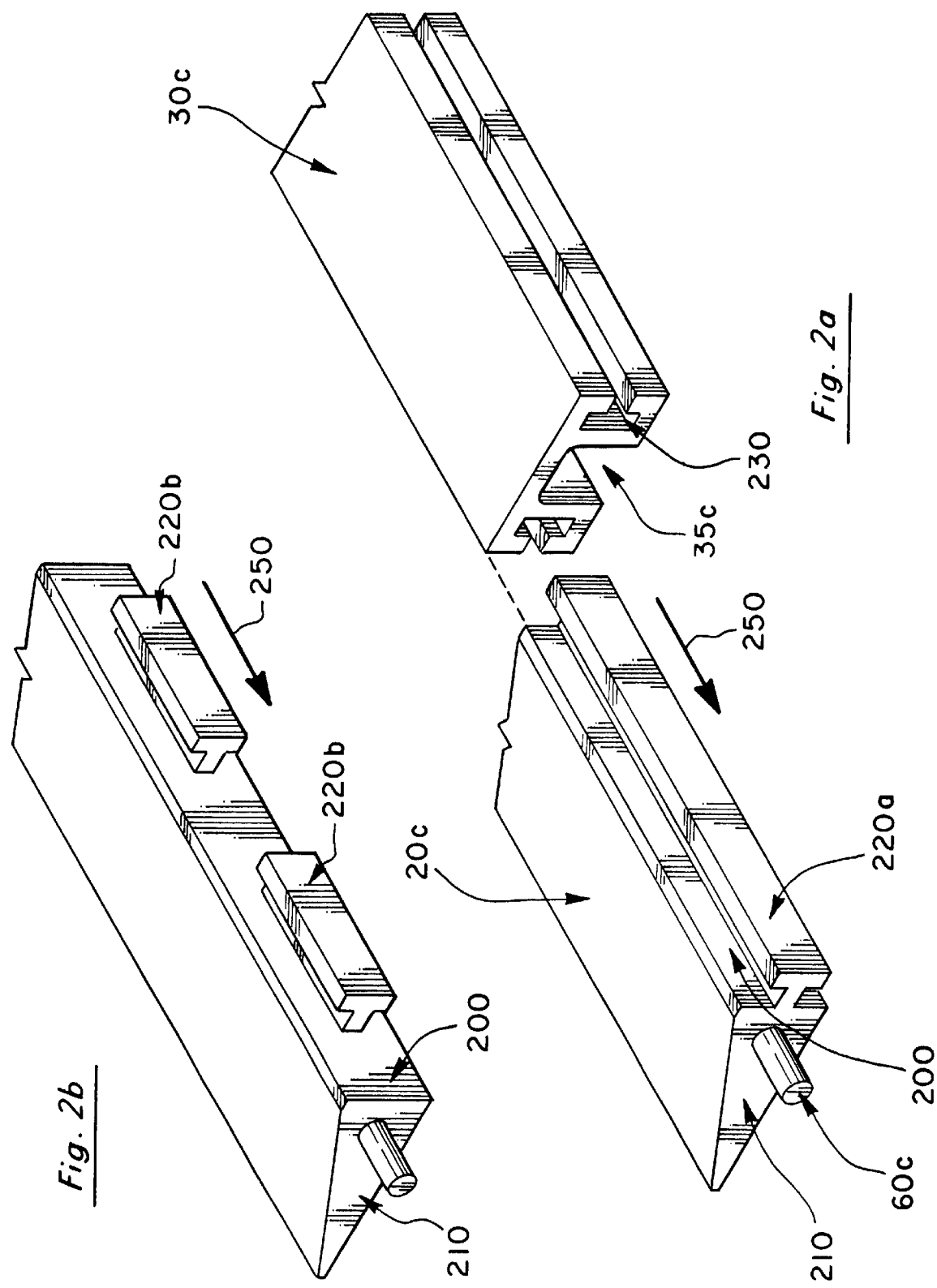
FIG. 2a is a perspective view showing the present invention being assembled.
FIG. 2b is a perspective view showing a second embodiment wherein the ramp connector has multiple portions.

Details of Assembly. Although FIG. 2a shows ramp 20c and central member 30c in detail, other ramps 20 and central members 30 have similar characteristics. Ramp 20c has a side portion 200, and opposing end portions 210. Plug member 60c is shown on end portion 210, and will be explained in greater detail below. In the preferred embodiment of FIG. 2a, a ramp connector 220a extends horizontally along the mid-section, the entire length of the side portion 200 of the ramp 20c. The central member 30 is formed with central member connectors 230 on opposing sides of the passageway 35c. The central member connectors 230 and ramp connector 220 complement one another to provide a relatively tight fit, but allow the ramp to slide lengthwise during assembly and disassembly.

As shown in FIG. 2a, the ramp connector 220a has an elongated neck leading into an enlarged head, and is shown extending horizontally along the mid-section of the ramp sidewall. The central member connector 230 is shown as a thru-section. It is to be expressly understood that the ramp connector 220a could be a thru-section and central member connector 230 would then be formed by an elongated neck leading into an enlarged head (e.g., FIG. 7). In addition, the central member connector 230 and the ramp connector 220a need not be precisely positioned along the midsection of the ramp sidewall. It is only important that the ramp connector 220a and central member connector 230 complement and align with one another so that they may slide together to form a fitted connection with one another.

The device 10 is assembled by placing one end 210 of the ramp 20c alongside the central member 30c, as shown in FIG. 2a, and aligning the ramp connector 220a and central member connector 230. The central member 30c and ramp 20c are then slid together (e.g., in the direction of arrow 250) so that the ramp connector 220a and the central member connector 230 slidably engage one another and form a fitted connection.

Figure 3:
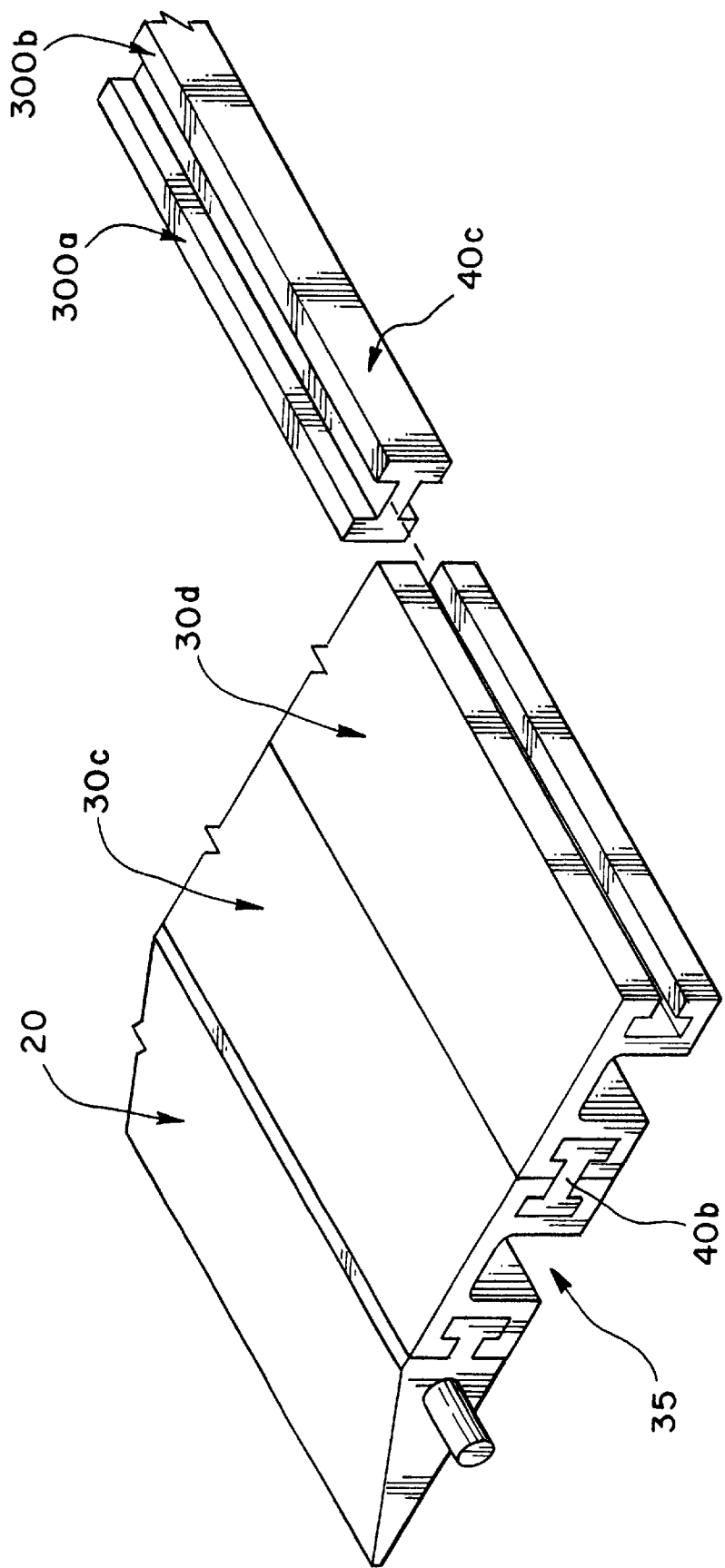
FIG. 3 is a perspective view showing assembly of additional central members linked by interconnect members.

In the preferred embodiment, the interconnect members 40b and 40c are generally I-shaped as shown in detail in FIG. 3. Each interconnect member 40b, 40c is formed by opposing connecting members 300a and 300b. Additional central members 30 can be added to the device 10 by sliding the connecting member (e.g., 300a) of an interconnect member 40 into the central member connector 230 of one of the central members 30c, and then sliding a second central member 30d onto the opposing connecting member (e.g., 300b) of interconnect member 40. In this manner, additional passageways 35 are linked together in device 10. After the desired number of central members 30 have been linked together using additional interconnect members 40, as just described, a second ramp 20 can also be slid into central member 30 as shown in FIG. 1.

Although in the preferred embodiment, the ramp connector 220 extends along the entire length of the ramp 20 (FIG. 2a), the ramp connectors 220b can extend along any side portion 200 of the ramp 20, (e.g., as shown in FIG. 2b). Additionally, multiple ramp connectors 220 can be spaced apart along the side portion 200 of a single ramp 20. Ramp connectors 220b can be formed as part of the ramp 20 or manufactured and assembled as separate members. However, in the preferred embodiment the ramp connectors 220a and 220b are formed as part of the ramps 20 (e.g., extruded or made of molded plastic) to provide additional strength to the device 10.

Alternatively, the central member 30c can be made with central member connectors that connect to other central members 30d. For example, central member connector 230 can be placed on one side of central member 30 and a connecting member, similar to ramp connector 220a, can be placed on the opposing side of the central member 30. However, the preferred embodiment includes interconnect members 40 instead, thus maintaining the modularity of the present invention.

Figure 4:
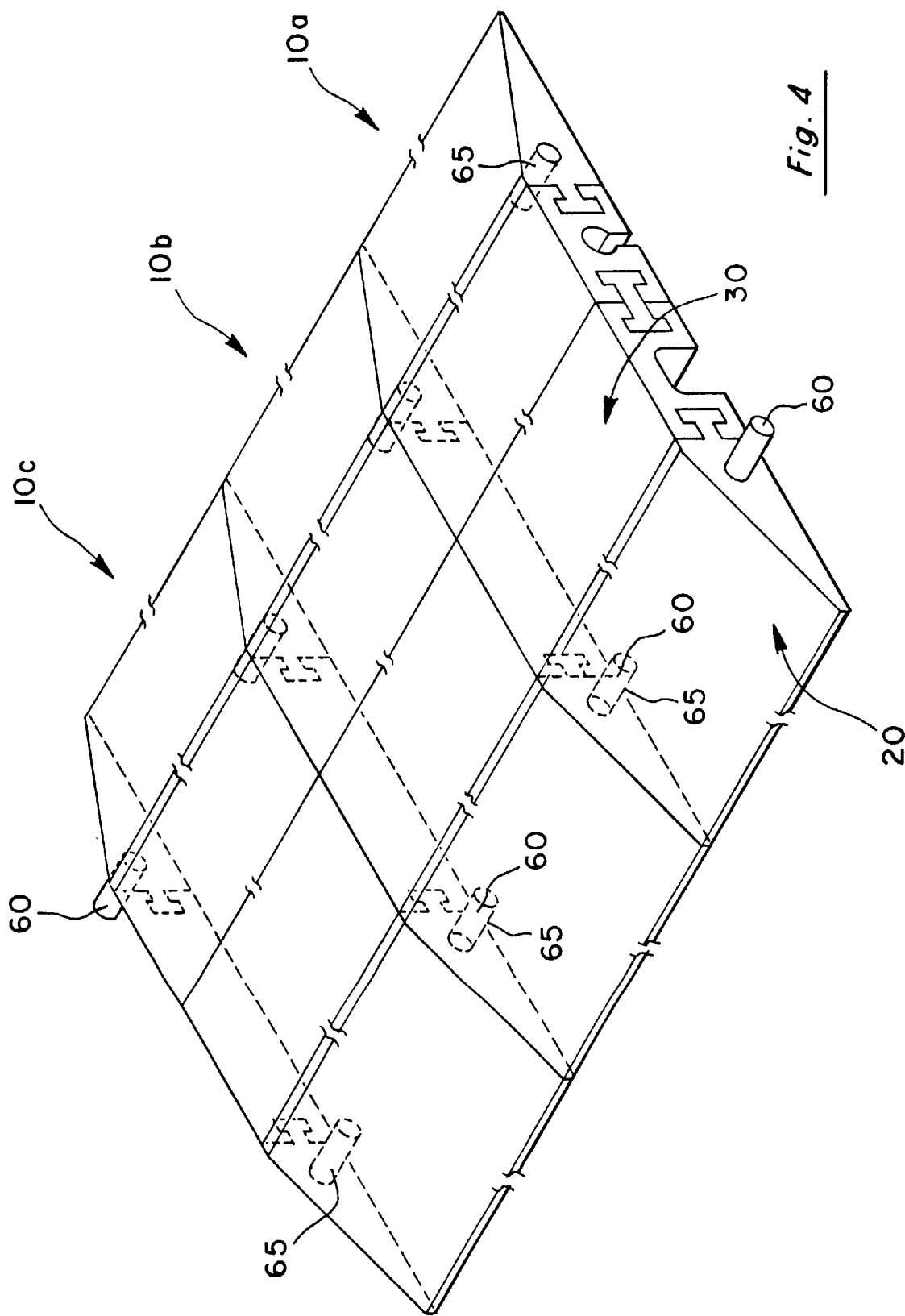
FIG. 4 is a perspective view of several assembled devices connected together in an end-to-end relationship.
Figure 5:
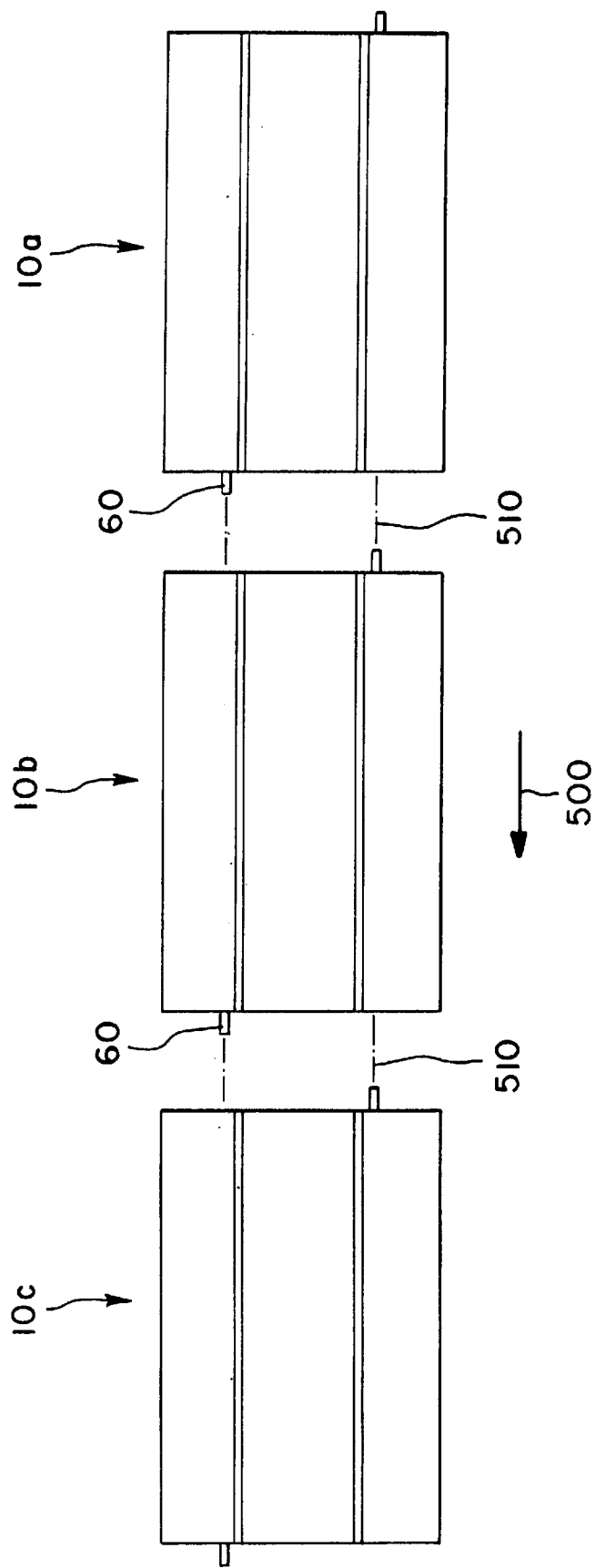
FIG. 5 is a top view corresponding to FIG. 4.

Combining Additional Devices into a Single Larger Device. The cable bridging device 10 includes end connectors (e.g., plug member 60 and receiving member 65) for connecting a plurality of modular cable bridging devices 10, as shown in FIGS. 4 and 5. These end connectors 60, 65 prevent devices 10a through 10c from sliding laterally with respect to one another when one device 10a is connected to a second device 10b, and so on. Assembled devices 10a through 10c can be thus linked end-to-end as shown in FIG. 4.

The plug member 60, shown in FIG. 4, is formed on one end of ramp 20, and the receiving member 65 is formed inside the opposite end of ramp 20. It can be seen that the modularity of the device 10 is thus maintained (e.g., any ramp 20 can be used in any ramp position, on either side of device 10).

FIG. 5 shows a top view of the cable bridging device 10 shown in FIG. 4. In the preferred embodiment, each cable bridging device 10a through 10c is first assembled as described above by assembling the ramps 20 to the central members 30. The assembled devices 10 are next aligned end-to-end along lines 510 and slid together (e.g., in the direction of arrow 500) so that each plug member 60 engages the respective receiving member 65. Plug member 60 and receiving member 65 thus prevent the devices 10a through 10c from sliding with respect to one another.

It is to be expressly understood that plug members 60 and receiving members 65 can be placed on either ramps 20 or central members 30 or both. While the preferred embodiment uses only one plug member 60 and one receiving member 65 on each ramp 20, multiple plug members 60 and receiving members 65 can be used. Likewise, the shape of the end connectors 60, 65 is not important to the present invention and can be square, triangular, or any other suitable shape, so long as the connectors complement and slidably engage one another. In addition, while only three assembled devices 10 are shown in FIG. 5, any number of assembled devices 10 can be linked together to provide protection for any length cable 50.

Figure 6:
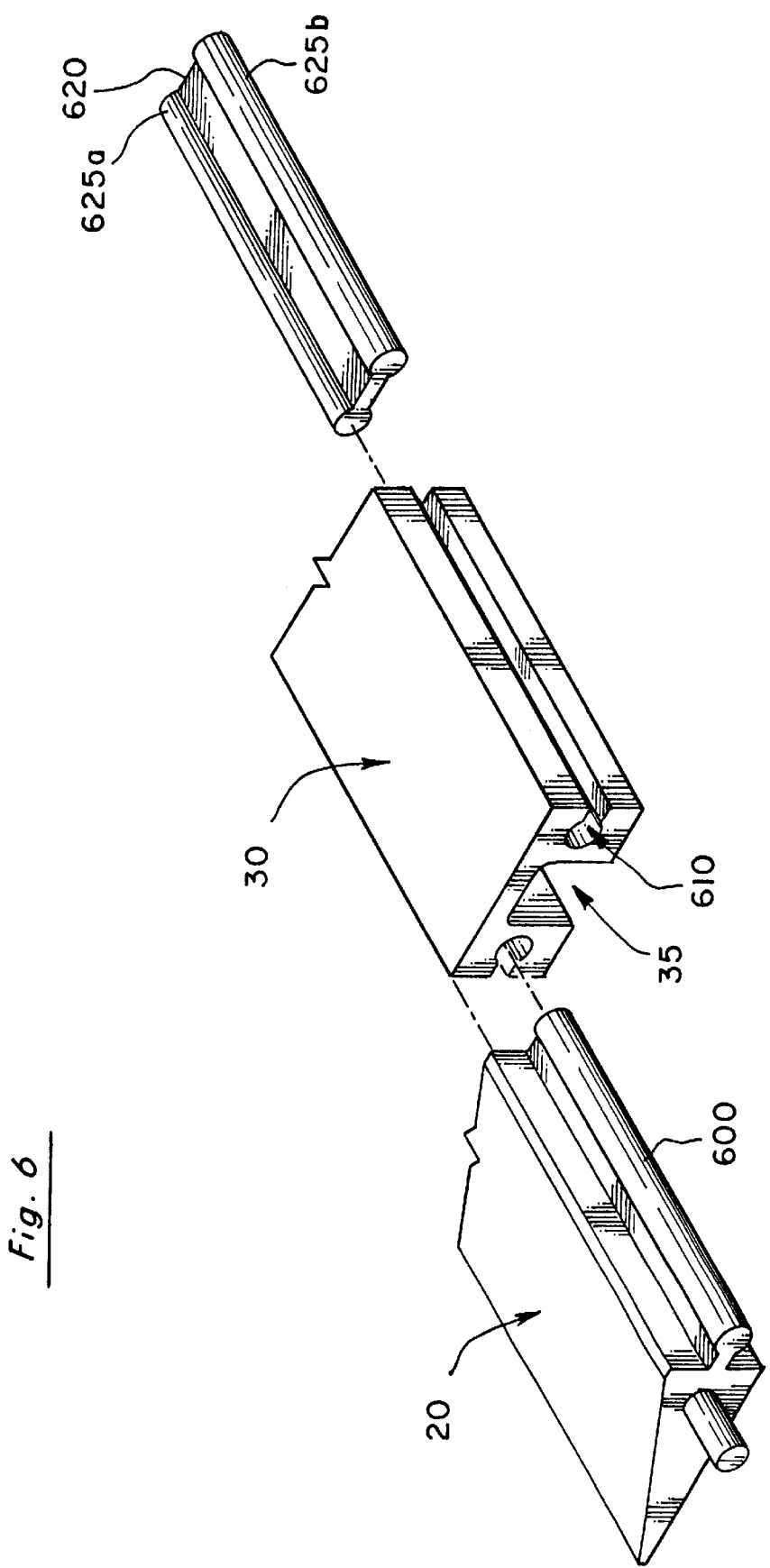
FIG. 6 is a perspective view of another embodiment of the present invention wherein the interlocking means are substantially circular in shape.

Other Embodiments. FIG. 6 shows another embodiment of the present invention with the ramp connector 600 and central member connector 610 shown substantially circular in shape. In addition, the interconnect member 620 has circular connecting members 625a and 625b that complement the central member connector 610. The shape of the connectors is not important to the present invention, so long as the connectors complement and slidably engage one another.

Figure 7:
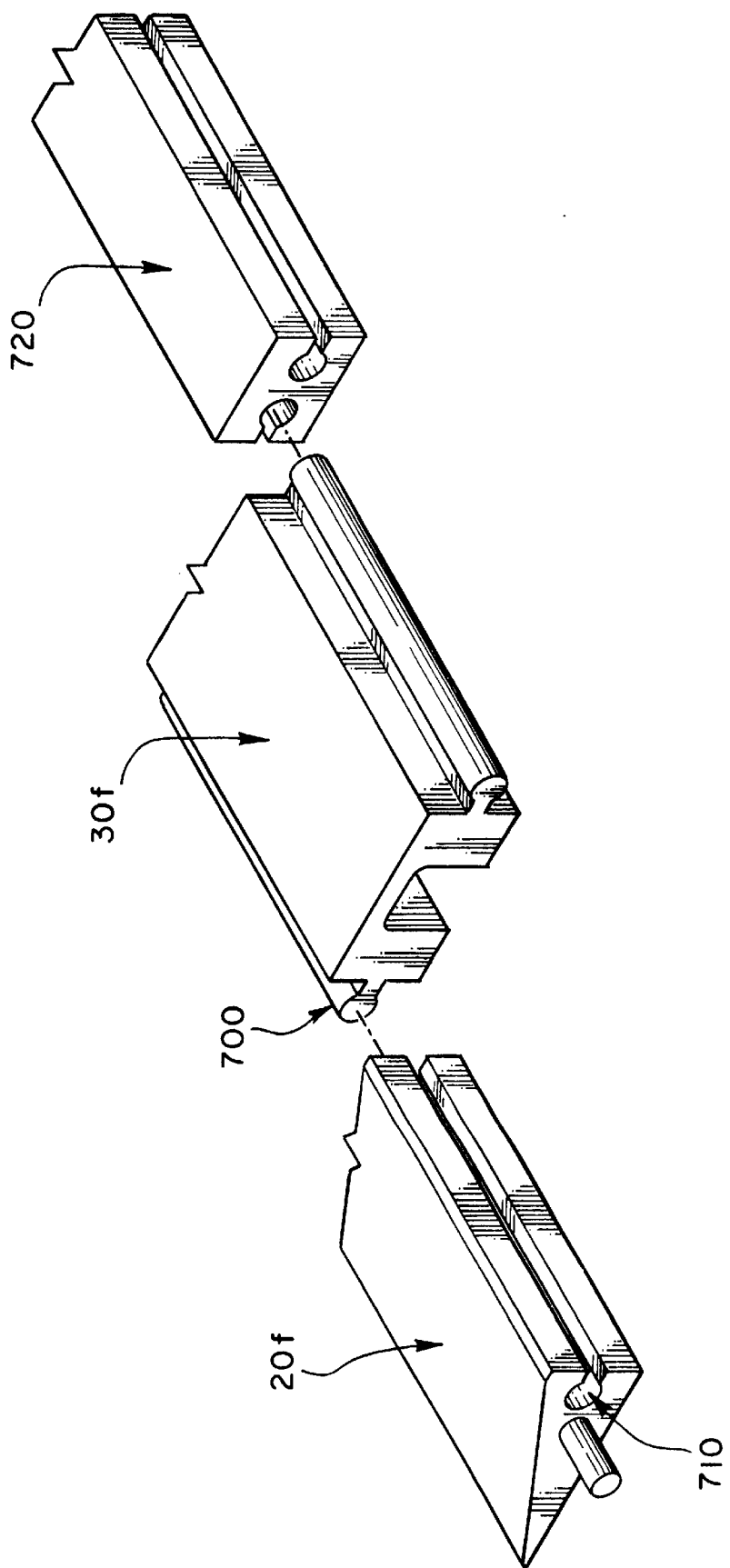
FIG. 7 is a perspective view of another embodiment of the present invention wherein the connectors are reversed from those shown in FIG. 6.

FIG. 7 shows yet another embodiment of the present invention, wherein the central member connector 700 on the central member 30f has an elongated neck portion ending in an enlarged head portion. The central member connector 700 can be slidably received by the ramp connector 710, shown as a thru-section within ramp 20f. Likewise, the interconnect member 720 is formed by opposing thru sections so as to receive the central member connectors 700 and preserve the modularity of the device 10. Although the connectors 700 and 710 are shown having a substantially circular cross-section, these connectors 700 and 710 could be substantially I-shaped, as shown in FIGS. 1–4. The shape of the connectors 700 and 710 is not important to the present invention and could be any shape so long as the connectors complement one another and have an enlarged head portion for slidably engaging one another. For example, the enlarged head portion could be triangular, square, or any other suitable shape.

FIG. 8 is a perspective view of an another embodiment showing various alternative features of the present invention that can be used individually or in combination with one another. For instance, additional passageways 835 may also be formed within the ramps 20. The orientation of the central members 30 can be reversed so that the passageway 35 faces upward due to the modularity of the preferred embodiment. In addition, a pattern of parallel ridges 70 may be extruded onto, or applied separately to, the surfaces of the ramps 20 and/or central members 30 to reduce the likelihood of slipping. Likewise, the ridge pattern 70 may also be placed on the bottom surfaces of the ramps 20 and/or central members 30 so that the ramps 20 grip the surface they are placed on without slipping.

A recessed track 820, also shown in FIG. 8, may be extruded along the length of the surface of the ramps 20 and a separate warning strip 825 is then inserted into the recessed track 820. The warning strip 825 would preferably be a bright, contrasting color such as bright orange or yellow to serve as a visual warning to people approaching the cable protector device 10. Although the warning strip 825 is shown in the shape of an inverted T, any suitable shape could be used so long as the warning strip 825 could be inserted into the surface of the ramp 20 to keep it from interfering with travel across the cable protector device 10. Likewise, the recessed track 820 could be any shape or depth as long as it can receive the warning strip 825.

FIGS. 8 and 9 also show an alternative embodiment of the plug members 800 and receiving members 805 used for connecting a series of adjacent devices in an end-to-end relationship. A receiving channel 806 is extruded throughout the entire width of ramp 20 in this embodiment. Alternatively, the receiving channel 806 may be bored only to the required depth into ramp 20 without departing from the scope of the present invention. In either case, the plug member 800 is separately molded and inserted into the end of the receiving channel 806, as shown in the detail cross-sectional view in FIG. 9. Likewise, the receiving member 805 is inserted within the end of the receiving channel 806 of an opposing ramp 20. The plug member 800 and receiving member 805 can be held in place in their respective receiving channels 806 merely by friction, or they can be permanently bonded to the receiving channels 806 by an adhesive. After installation of these connectors, adjacent cable bridging devices 10a, 10, and 10c can be removably joined together by properly aligning the devices in an end-to-end relationship, and then inserting the respective plug members 800 into the corresponding receiving members 805. The circumferential rib on the plug member 800 provides a snap fit with the corresponding inside diameter transition within the receiving member 805, as shown in FIG. 9.

The above disclosure sets forth a number of embodiments of the present invention. Other arrangements or embodiments, not precisely set forth, could be practiced under the teachings of the present invention and as set forth in the following claims.

I claim:

1. A modular cable bridging device for protecting cables comprising:
   at least one ramp having a sidewall;
   at least one central member having a sidewall and a passageway for receiving a cable therethrough;
   a ramp connector extending horizontally along at least a portion of the sidewall of said ramp; and
   a complementary central member connector extending horizontally along at least a portion of the sidewall of said central member for slidably engaging said ramp connector in a direction parallel to said sidewall of said central member.

2. The modular cable bridging device of claim 1 wherein said ramp connector comprises an elongated neck ending in an enlarged head portion and said complementary central member connector comprises a thru-section.

3. The modular cable bridging device of claim 1 wherein said ramp connector comprises a thru-section and said complementary central member connector comprises an elongated neck ending in an enlarged head portion.

4. The modular cable bridging device of claim 1 wherein said ramp connector and said central member connector have a substantially T-shaped cross-section.

5. The modular cable bridging device of claim 1 wherein said ramp connector and central member connector have a substantially circular cross-section.

6. The modular cable bridging device of claim 1 wherein said ramp connector extends horizontally along the mid-section of said sidewall portion of said ramp.

7. The modular cable bridging device of claim 1 further comprising:
   a plurality of central members, each central member having two opposing sidewalls;
   a complementary central member connector on each of said opposing sidewalls of each said central member; and
   an interconnect member formed by two opposing ramp connectors and further having a sidewall, each of said opposing ramp connectors of said interconnect member slidably engaging the complementary central member connector of said at least two separate central members by positioning said central member sidewalls parallel and adjacent to said interconnect member sidewall and sliding said interconnect member and said complementary central member connectors together in a direction parallel to said sidewalls, thereby removably securing said central members to one another.

8. The modular cable bridging device of claim 7 wherein said interconnect member is substantially I-shaped.

9. The modular cable bridging device of claim 7 wherein said interconnect member is comprised of opposing thru-sections that are substantially circular-shaped.

10. The modular cable bridging device of claim 7 wherein said interconnect member is comprised of opposing enlarged head sections separated by an elongated section, said enlarged head sections being substantially circular-shaped.

11. The modular cable bridging device of claim 7 wherein said interconnect member is comprised of opposing thru-sections that are substantially T-shaped.

12. The modular cable bridging device of claim 1 further comprising:
   a plurality of ramps;
   a plurality of central members, at least one of said central members attached to each ramp;
   at least one plug member on each ramp; and
   at least one receiving member formed within each ramp, said plug and receiving members positioned opposing one another on each of said ramps for engaging an additional ramp, thereby extending the modular cable bridging device by adding additional ramps and central members side-by-side.

13. The modular cable bridging device of claim 1 further comprising:
   a plurality of ramps;
   a plurality of central members, at least one of said central members attached to each ramp;
   at least one receiving channel formed within each ramp;
   at least one plug member insertable into said receiving channel on said first ramp; and
   at least one receiving member insertable into said receiving channel of said second ramp, said plug and receiving members positioned opposing one another on each of said ramps for engaging an additional ramp, thereby extending the modular cable bridging device by adding additional ramps and central members in an end-to-end relationship.

14. The modular cable bridging device of claim 1 wherein said passageway of said central member is substantially U-shaped.

15. The modular cable bridging device of claim 1 further comprising:
   a warning strip having a contrasting color; and
   a recessed track extending along said ramp for receiving said warning strip.

16. A modular cable bridging device for protecting cables, said modular cable bridging device comprising:
   a plurality of ramps, each ramp having a sidewall;
   a plurality of central members, each central member having opposing sidewalls and a passageway for receiving a cable therethrough;
   a ramp connector extending horizontally along at least a portion of the midsection of the sidewall of each of said plurality of ramps;
   a complementary central member connector extending horizontally along the midsection of each of said opposing sidewalls of each said central member, said complementary central member connector slidably engaging said ramp connector in a direction parallel to each said opposing sidewall of said central member, thereby securing said ramp to said central member and bridging said cable;
   at least one interconnect member formed by two opposing ramp connectors extending along a midsection of the interconnect member, said interconnect member further having a sidewall, each of said opposing ramp connectors of said interconnect member slidably engaging the complementary central member connector of separate central members by sliding said interconnect member and said central members together in a direction parallel to said sidewalls, thereby removably securing said central members to one another;
   an end connector on each ramp for engaging a complementary end connector on a second ramp, thereby extending the modular cable bridging device.

17. The modular cable bridging device of claim 16 wherein said ramp connectors comprise an elongated neck ending in an enlarged head portion and said complementary central member connector comprises a thru-section.

18. The modular cable bridging device of claim 16 wherein said ramp connectors comprise a thru-section and said complementary central member connectors comprise an elongated neck ending in an enlarged head portion.

19. The modular cable bridging device of claim 16 wherein said ramp connectors and said central member connectors have a substantially T-shaped cross-section.

20. The modular cable bridging device of claim 16 wherein said ramp connectors and said central member connectors have a substantially circular cross-section.

21. A modular cable bridging device for protecting cables comprising:
   a ramp having a side wall, and a ramp connector extending horizontally along said side wall of said ramp; and
   a central member having:
   (a) a passageway extending along the length of said central member for receiving a cable;
   (b) opposing side walls; and
   (c) a central member connector extending horizontally along each of said opposing side walls of said central member for slidably engaging said ramp connector in a direction parallel to said side wall of said central member;
   wherein one of said ramp connectors and one of said central member connectors is a female connector having:
   (a) a slot extending horizontally along said side wall; and
   (b) an enlarged inner passageway extending horizontally along said side wall behind said slot; and
   wherein the other of said ramp connectors and the other of said central member connectors is a male connector having:
   (a) a neck extending horizontally along said side wall having a thickness allowing said neck to slide along said slot; and
   (b) an enlarged head extending horizontally along said neck, said enlarged head sliding along said enlarged inner passageway but being retained by said slot.

22. A modular cable bridging device for protecting cables comprising:
   at least one ramp having a sidewall;
   at least one central member having a sidewall and a passageway for receiving a cable therethrough;
   a ramp connector extending along at least a portion of the sidewall of said ramp;
   a warning strip having a contrasting color;
   a recessed track extending along said ramp for receiving said warning strip; and
   a complementary central member connector extending along at least a portion of the sidewall of said central member for slidably engaging said ramp connector in a direction parallel to said sidewall of said central member.

* * * * *